US012620543B2

(12) United States Patent
Mao et al.

(10) Patent No.: US 12,620,543 B2
(45) **Date of Patent: *May 5, 2026**

(54) SOLID-STATE CIRCUIT BREAKER

(71) Applicant: Schneider Electric (China) Co., Ltd., Beijing (CN)

(72) Inventors: Shunxian Mao, Shanghai (CN); Haijun Zhao, Shanghai (CN); Jiamin Chen, Shanghai (CN); Hongliang Wang, Shanghai (CN); Yu Chen, Shanghai (CN); Hanyi Liu, Shanghai (CN); Ying Shi, Shanghai (CN)

(73) Assignee: Schneider Electric (China) Co., Ltd, Beijing (CN)

( * ) Notice: Subject to any disclaimer, the term of this patent is extended or adjusted under 35 U.S.C. 154(b) by 301 days.

This patent is subject to a terminal disclaimer.

(21) Appl. No.: 18/515,371

(22) Filed: Nov. 21, 2023

(65) Prior Publication Data

US 2025/0022675 A1 Jan. 16, 2025

(30) Foreign Application Priority Data

Jul. 14, 2023 (CN) ......................... 202310870219.6

(51) Int. Cl.
*H01H 1/14* (2006.01)
*H01H 9/02* (2006.01)
(Continued)

(52) U.S. Cl.
CPC .............. *H01H 89/00* (2013.01); *H01H 1/14* (2013.01); *H01H 9/02* (2013.01); *H01H 9/26* (2013.01)

(58) Field of Classification Search
CPC .. H01H 1/14; H01H 3/02; H01H 9/02; H01H 9/26; H01H 9/548; H01H 71/04;
(Continued)

(56) References Cited

U.S. PATENT DOCUMENTS 4,490,769 A * 12/1984 Boenig .................. H02H 9/023 361/19
10,116,132 B2 * 10/2018 Lee ...................... H01H 33/596
(Continued)

FOREIGN PATENT DOCUMENTS

CN 105702536 A 6/2016
EP 2509091 B1 4/2016
(Continued)

OTHER PUBLICATIONS

Extended European Search Report dated Apr. 29, 2024 for corresponding European Patent Application No. 23211182.3-1201, 9 pages.

*Primary Examiner* — William A Bolton
(74) *Attorney, Agent, or Firm* — Quinn IP Law

(57) ABSTRACT

The present disclosure discloses a solid-state circuit breaker including an electronic switch and a mechanical switch connected in series, the mechanical switch includes: a handle micro-switch, configured to be actuated upon the handle rotating to the on position and released upon the handle leaving the on position; a contact micro-switch, installed to the housing and configured to be actuated upon the movable contact moving to a closed position and released upon the movable contact leaving the closed position. By detecting a state of the handle micro-switch and a state of the contact micro-switch, it is achieved that, upon the solid-state circuit breaker being switched from off to on, the mechanical switch is turned on first, and then the electronic switch is turned on, upon the solid-state circuit breaker being switched from on to off, the electronic switch is turned off first, and then the mechanical switch is turned off.

11 Claims, 6 Drawing Sheets

(51) Int. Cl.
*H01H 9/26* (2006.01)
*H01H 89/00* (2006.01)

(58) Field of Classification Search
CPC .. H01H 71/123; H01H 71/10; H01H 71/0207; H01H 71/24; H01H 71/56; H01H 71/526; H01H 2071/565; H01H 73/04; H01H 89/00
USPC .......................................... 200/293, 292, 400
See application file for complete search history.

(56) References Cited

U.S. PATENT DOCUMENTS

| | | | | |
|---|---|---|---|---|
| 10,326,264 B1 * | 6/2019 | Gass | H02H 3/044 | |
| 11,368,010 B2 * | 6/2022 | Lichauer | H02H 1/0007 | |
| 11,398,724 B1 * | 7/2022 | Yang | H02H 1/0007 | |
| 2011/0273249 A1 * | 11/2011 | Wan | H01H 71/123 | 335/11 |
| 2017/0004948 A1 * | 1/2017 | Leyh | H01H 9/547 | |
| 2022/0209511 A1 * | 6/2022 | Santore | H05K 7/2039 | |
| 2023/0074777 A1 * | 3/2023 | Song | H02H 3/08 | |

FOREIGN PATENT DOCUMENTS

| | | |
|---|---|---|
| KR | 200376466 Y1 | 3/2005 |
| WO | 2022243419 A1 | 11/2022 |

* cited by examiner

SOLID-STATE CIRCUIT BREAKER

TECHNICAL FIELD

The present disclosure relates to a solid-state circuit breaker.

BACKGROUND

The fast breaking ability of solid-state circuit breakers is favored by more and more new energy applications, and DC solid-state circuit breakers with protection function are also one of the requirements of industrial applications. The solid-state circuit breaker includes an electronic switch and a mechanical switch connected in series, and it is required that under normal circumstances, upon being energized to turn off, the electronic switch is turned off first, and then the mechanical switch (not energized) is turned off; upon being energized to turn on, the mechanical switch is turned on first (not energized) and then the electronic switch is turned on.

SUMMARY

According to the present disclosure, a solid-state circuit breaker is proposed, which includes an electronic switch and a mechanical switch connected in series, the mechanical switch includes: a housing; a handle, rotatably installed to the housing and rotatable between an on position and an off position; a movable contact and a stationary contact, wherein the movable contact is configured to be movable between an open position and a closed position, in the open position, the movable contact is not in contact with the stationary contact, and in a closed position, the movable contact is in contact with the stationary contact; a movable contact bracket, wherein the movable contact is installed on the movable contact bracket; a transmission assembly, being capable of transmitting a motion of the handle to the movable contact bracket to drive the movable contact to achieve contact and separation with the stationary contact; a handle micro-switch, installed to the housing and configured to be actuated upon the handle rotating to the on position and released upon the handle leaving the on position, so that the handle micro-switch is in an on state of the handle micro-switch upon the handle being in the on position and the handle micro-switch is in an off state of the handle micro-switch upon the handle leaving the on position; a contact micro-switch, installed to the housing and configured to be actuated upon the movable contact moving to a closed position and released upon the movable contact leaving the closed position, so that the contact micro-switch is in an on state of the contact micro-switch upon the movable contact being in the closed position and the contact micro-switch is in an off state of the contact micro-switch upon the movable contact leaving the closed position. By detecting a state of the handle micro-switch and a state of the contact micro-switch, it is achieved that, upon the solid-state circuit breaker being switched from off to on, the mechanical switch is turned on first, and then the electronic switch is turned on, upon the solid-state circuit breaker being switched from on to off, the electronic switch is turned off first, and then the mechanical switch is turned off.

By adding the handle micro-switch and the contact micro-switch, the state of the handle and the state of the movable contact can be detected conveniently, and then the solid-state circuit breaker can be controlled conveniently to achieve the function of the solid-state circuit breaker.

The solid-state circuit breaker according to the present disclosure may include one or more of the following features.

According to an embodiment, the movable contact bracket includes an actuating protrusion, and the contact micro-switch is arranged close to an end point of a motion path of the actuating protrusion during a closing process, so that the actuating protrusion actuates the contact micro-switch to the on state of the contact micro-switch upon the movable contact bracket driving the movable contact to move to the closed position, and the actuating protrusion releases the contact micro-switch to the off state of the contact micro-switch upon the movable contact bracket driving the movable contact to leave the closed position.

According to an embodiment, the solid-state circuit breaker includes an actuating member, and the motion of the handle between the on position and the off position drives the actuating member to move, and the handle micro-switch is arranged close to an end point of a motion path of the actuating member during a closing process, so that the actuating member is driven by the handle and drives the handle micro-switch to the on state of the handle micro-switch upon the handle moving to the on position, and the actuating member is driven by the handle and release the handle micro-switch to the off state of the handle micro-switch upon the handle leaving the on position.

According to an embodiment, in a case of manually operating the solid-state circuit breaker from off to on: the handle is manually rotated from the off position to the on position, and the motion of the handle is transmitted to the movable contact bracket through the transmission assembly, so as to drive the movable contact to move from the open position to the closed position, upon the movable contact reaching the closed position, the contact micro-switch is actuated to the on state of the contact micro-switch, and the mechanical switch is turned on, meanwhile, upon the handle moving to the on position, the handle micro-switch is actuated to the on state of the handle micro-switch, upon the contact micro-switch being in the on state of the contact micro-switch the handle micro-switch being in the on state of the handle micro-switch, the solid-state circuit breaker is a hot standby state, upon the solid-state circuit breaker being in the hot standby state, if the electronic switch is turned on, the solid-state circuit breaker is turned on.

According to an embodiment, the solid-state circuit breaker further includes a tripping unit being electrically driven and configured to trip upon being electrically driven, so that the transmission assembly is actuated to switch the movable contact from the closed position to the open position.

According to an embodiment, the tripping unit includes: an excitation coil, wrapped with an insulating sheath; and a push rod assembly, driven to trigger tripping upon the excitation coil being energized.

According to an embodiment, the solid-state circuit breaker further includes an arc extinguishing chamber arranged close to the stationary contact, and the tripping unit is arranged between the transmission assembly and the arc extinguishing chamber.

According to an embodiment, in a case of manually switching the solid-state circuit breaker from on to off: the handle is manually rotated from the on position to the off position, upon the handle leaving the on position, the handle micro-switch is released to the off state of the handle micro-switch, at this time, in response to the off state of the handle micro-switch, the electronic switch is turned off, and then the tripping unit is electrically driven, the transmission assembly is actuated to drive the movable contact to move from the closed position to the open position, upon the movable contact leaving the closed position, the contact micro-switch is released to the off state of the contact micro-switch, upon the movable contact reaching the off position, the mechanical switch is turned off, so that the solid-state circuit breaker is turned off.

According to an embodiment, in a case of electrically driving the solid-state circuit breaker from on to off: the electronic switch is turned off, and then the tripping unit is driven electronically, the transmission assembly is actuated to drive the movable contact to move from the closed position to the open position, upon the movable contact leaving the closed position, the contact micro-switch is released to the off state of the contact micro-switch, upon the movable contact reaching the open position, the mechanical switch is turned off and the solid-state circuit breaker is turned off, at the same time, the transmission assembly is actuated to drive the handle to move from the on position to the off position, upon the handle leaving the on position, the handle micro-switch is released to the off state of the handle micro-switch.

According to an embodiment, the case of electrically driving the solid-state circuit breaker from on to off is triggered remotely or upon a fault occurring.

According to an embodiment, the solid-state circuit breaker further includes a mechanical synchronization mechanism for multi-level use, the mechanical synchronization mechanism includes: a transmission linkage, connected to a part of multiple levels of transmission assemblies and configured to interlock the multiple levels of transmission assemblies; and a tripping linkage, connected to multiple levels of tripping units and configured to interlock the multiple levels of tripping units.

BRIEF DESCRIPTION OF DRAWINGS

In order to explain the technical scheme of the embodiment of the present disclosure more clearly, the attached drawings of the embodiment of the present disclosure will be briefly introduced below. Among them, the drawings are only used to show some embodiments of the present disclosure, and are not limited to all embodiments of the present disclosure.

LIST OF REFERENCE NUMERALS

Figure 1:
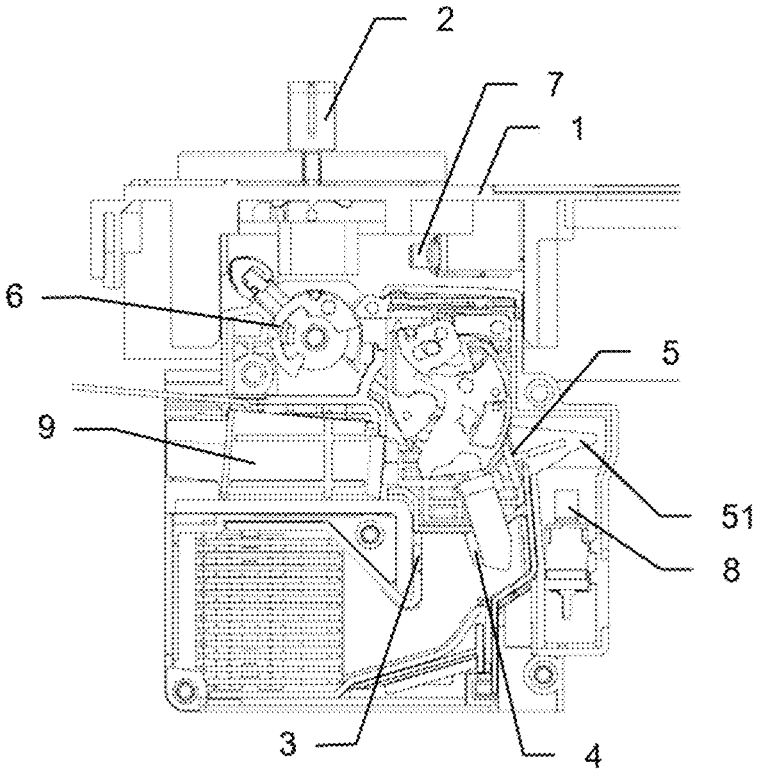
FIG. 1 is a schematic diagram showing that a mechanical switch of a solid-state circuit breaker according to the present disclosure is in an off state.

1—housing
2—handle
3—stationary contact
4—movable contact
5—movable contact bracket
51—actuating protrusion
6—transmission assembly
7—handle micro-switch
8—contact micro-switch
9—tripping unit
101—transmission linkage
102—tripping linkage

DETAILED DESCRIPTION

In order to make the purpose, technical solution and advantages of the technical solution of the present disclosure more clear, the technical solution of the embodiments of the present disclosure will be described clearly and completely in the following with the accompanying drawings of specific embodiments of the present disclosure. The same reference numerals in the drawings represent the same components. It should be noted that the described embodiments are a part of the embodiments of the present disclosure, not all the embodiments. Based on the described embodiments of the present disclosure, all other embodiments obtained by ordinary skilled in the field without creative labor belong to the protection scope of the present disclosure.

Unless otherwise defined, technical terms or scientific terms used herein shall have their ordinary meanings as understood by people with ordinary skills in the field to which the present disclosure belongs. The words "first", "second" and similar words used in the specification and claims of the patent application of the present disclosure do not indicate any order, quantity or importance, but are only used to distinguish different components. Similar words such as "including" or "containing" refer to that the elements or objects appearing before the word cover the elements or objects listed after the word and their equivalents, without excluding other elements or objects. Similar words such as "connected" or "connected" are not limited to physical or mechanical connection, but can include electrical connection, whether direct or indirect. "Up", "Down", "Left" and "Right" are only used to indicate the relative positional relationship. Upon the absolute position of the described object changes, the relative positional relationship may also change accordingly.

Hereinafter, the present disclosure will be described in detail below by describing example embodiments.

The solid-state circuit breaker according to the present disclosure includes an electronic switch and a mechanical switch connected in series. The electronic switch, also known as a semiconductor switch, can be controlled by receiving an electrical signal. The mechanical switch includes a housing 1; a handle 2 rotatably installed to the housing 1 and rotatable between an on position and an off position; a movable contact 4 and a stationary contact 3, the movable contact 4 is configured to be movable between an open position and a closed position, in the open position, the movable contact 4 is not in contact the stationary contact 3, and in the closed position, the movable contact 4 is in contact with the stationary contact 3; a movable contact bracket 5, the movable contact 4 is installed on the movable contact bracket 5; a transmission assembly 6, being capable of transmitting a motion of the handle 2 to the movable contact bracket 5 to drive the movable contact 4 to achieve contact and separation with the stationary contact 3.

Figure 2:
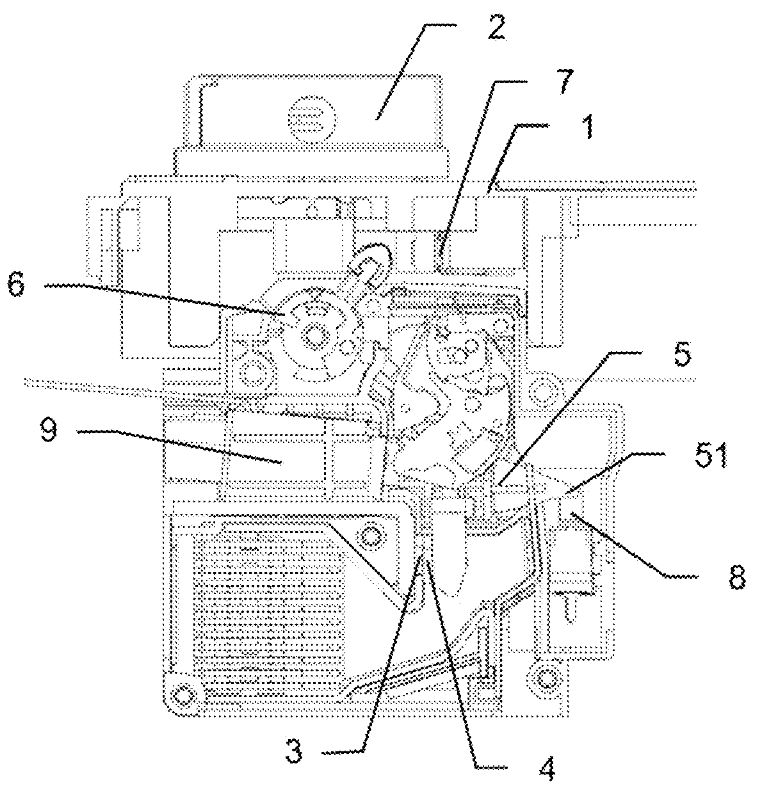
FIG. 2 is a schematic diagram showing that a mechanical switch of a solid-state circuit breaker according to the present disclosure is in an on state.

As illustrated by FIGS. 1 and 2, the mechanical switch of the solid-state circuit breaker according to the present disclosure may further include a handle micro-switch 7 and a contact micro-switch 8.

The handle micro-switch 7 is installed to the housing 1 and is configured to be actuated upon the handle 2 rotating to the on position and released upon the handle 2 leaving the on position, so that the handle micro-switch 7 is in an on state of the handle micro-switch upon the handle 2 being in the on position and the handle micro-switch 7 is in an off state of the handle micro-switch upon the handle 2 leaving the on position. Specifically, an actuating member 6A configured to actuate and release the handle micro-switch 7 may be provided on the handle 2 or the transmission assembly 6. The motion of the handle 2 between the on position and the off position drives the actuating member 6A to move, and the handle micro-switch 7 is arranged close to an end point of a motion path of the actuating member 6A in a closing process, so that the actuating member 6A is driven by the handle 2 and drives the handle micro-switch 7 to the on state of handle micro-switch 7 upon the handle 2 moving to the on position. The actuating member 6A is driven by the handle 2 and releases the handle micro-switch 7 to the off state of the handle micro-switch 7 upon the handle 2 leaving the on position. By setting the handle micro-switch 7, it is convenient to detect whether the handle 2 is in the on position, so as to control the solid-state circuit breaker according to whether the handle 2 is in the on position.

The contact micro-switch 8 is installed to the housing 1 and is configured to be actuated upon the movable contact 4 moving to the closed position and released upon the movable contact 4 leaving the closed position, so that the contact micro-switch 8 is in the on state of the contact micro-switch 8 upon the movable contact 4 being in the closed position and in the off state of the contact micro-switch 8 upon the movable contact 4 leaving the closed position. Specifically, an actuating protrusion 51 configured to actuate and release the contact micro-switch 8 may be provided on the movable contact bracket 5. For example, the movable contact bracket 5 includes the actuating protrusion 51, and the contact micro-switch 8 is arranged close to an end point on a motion path of the actuating protrusion 51.

By adding the handle micro-switch 7 and the contact micro-switch 8, the state of the handle 2 and the state of the movable contact 4 can be conveniently detected, and then the solid-state circuit breaker can be conveniently controlled, so that upon the solid-state circuit breaker being switched from off to on, the mechanical switch is turned on first, and then the electronic switch is turned on, and upon the solid-state circuit breaker being switched from on to off, the electronic switch is turned off first and then the mechanical switch is turned off.

The solid-state circuit breaker according to the present disclosure may further include a tripping unit 9 being electrically driven, the tripping unit 9 may be arranged close to the transmission assembly 6 and configured to trip upon being electrically driven, so that the transmission assembly 6 is actuated to drive the movable contact 4 to switch from the closed position to the open position. That is to say, the solid-state circuit breaker according to the present disclosure can have a tripping function being electrically driven, and the tripping can be performed through the control of an electrical signal. Specifically, the electrically driven tripping unit 9 may include an excitation coil wrapped with an insulating sheath and a push rod assembly. Upon the excitation coil being energized, the push rod assembly is driven to trigger the tripping, for example, upon the push rod assembly being driven, the push rod assembly pushes a part of the transmission assembly 6, so that the movable contact bracket 5 drives the movable contact 4 to the closed position.

The mechanical switch of the solid-state circuit breaker according to the present disclosure may further include an arc extinguishing chamber, which is arranged close to the stationary contact and configured to guide and extinguish the arc generated upon separating the movable contact from the stationary contact.

As illustrated by FIGS. 1 and 2, for the mechanical switch of the solid-state circuit breaker according to the present disclosure, the handle 2 on the top drives the movable contact bracket 5 located at the right lower side through the transmission assembly 6 extending from a lower part of the handle 2 to the middle part of the handle 2, thus driving the movable contact 4 to move. The stationary contact 3 is arranged at the left side of the movable contact 4, the arc extinguishing chamber is arranged at the left side of the stationary contact 3, and the electrically driven tripping unit 9 is arranged between the transmission assembly 6 and the arc extinguishing chamber in the up-down direction. The whole design is particularly compact, and the whole layout and the setting of the arc extinguishing chamber make the mechanical switch have the function of turning off when energized, that is, upon the electronic switch failing, the mechanical switch can still be turned off when energized, especially under the condition of high voltage DC, the mechanical switch can still have the breaking ability, and the off state meets the requirements of isolating contacts.

Figure 3:
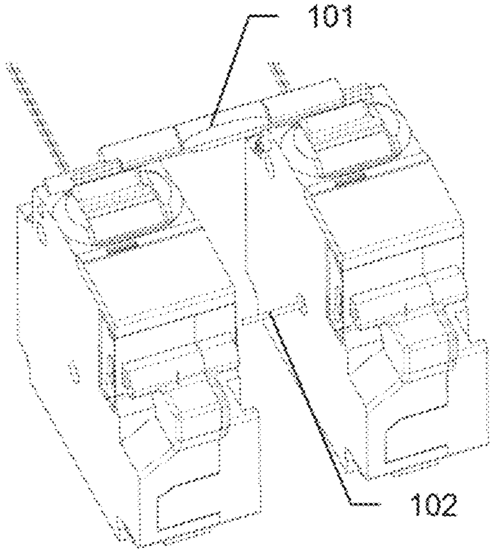
FIG. 3 is a schematic diagram showing a mechanical synchronization mechanism of a solid-state circuit breaker according to the present disclosure upon being used in multi-levels.

The solid-state circuit breaker according to the present disclosure may have multiple levels. In the case that there are multiple levels, the solid-state circuit breaker can also include a mechanical synchronization mechanism for multi-level use. Specifically, as illustrated by FIG. 3, the mechanical synchronization mechanism may include a transmission linkage 101 connected to a part of multiple levels of transmission assemblies 6 and configured to interlock the multiple levels of transmission assemblies 6; and a tripping linkage 102 connected to multiple levels of tripping units 9 and configured to interlock the multiple levels of tripping units 9. Under the action of the mechanical synchronization mechanism, the handle 2 can simultaneously and synchronously drive the multiple levels of transmission assemblies 6 to move, and the tripping units 9 can trip the multi-levels simultaneously and synchronously.

Figure 4:
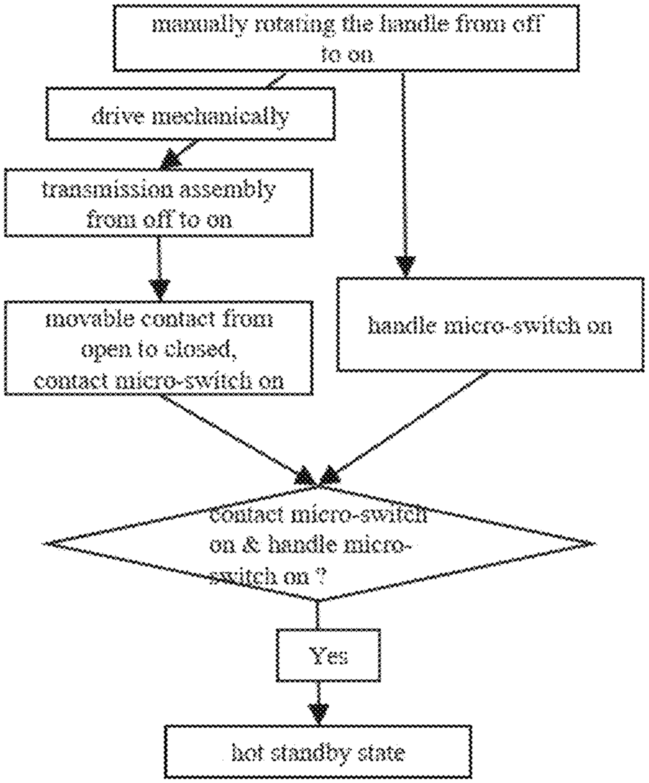
FIG. 4 is a flow chart of a solid-state circuit breaker according to the present disclosure being manually switched from an off state to a hot standby state.
Figure 5:
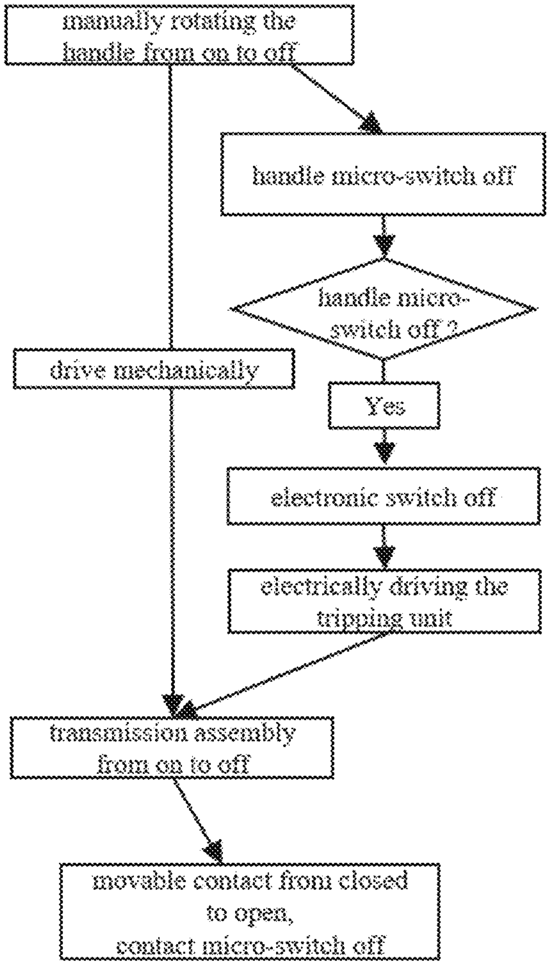
FIG. 5 is a flow chart of a solid-state circuit breaker according to the present disclosure being manually switched from an on state to an off state.
Figure 6:
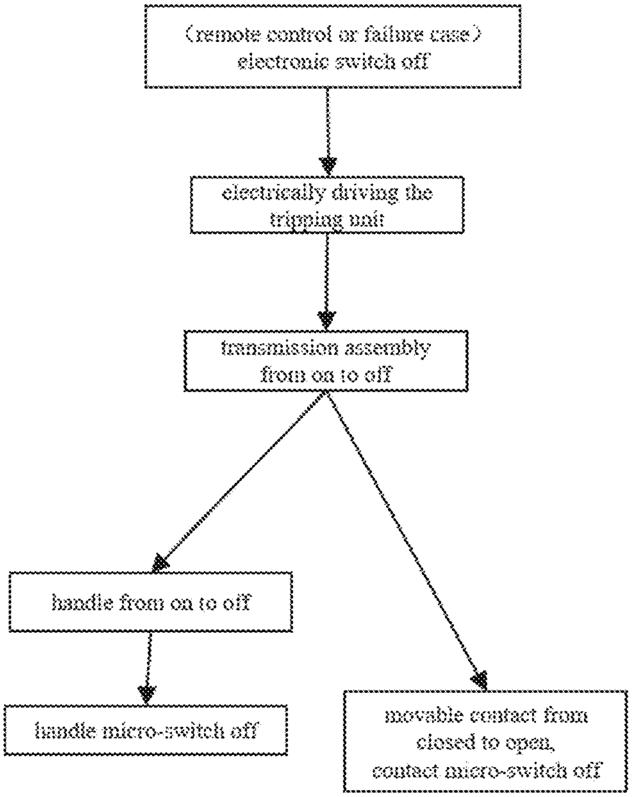
FIG. 6 is a flow chart of the solid-state circuit breaker according to the present disclosure being electrically driven to switch from an on state to an off state.

FIG. 4 is a flow chart of a solid-state circuit breaker according to the present disclosure being manually switched from an off state to a hot standby state. FIG. 5 is a flow chart of a solid-state circuit breaker according to the present disclosure being manually switched from an on state to an off state. FIG. 6 is a flow chart of the solid-state circuit breaker according to the present disclosure being electrically driven to switch from an on state to an off state. With reference to FIGS. 4-6, the logic design of various state switching of the solid-state circuit breaker according to the present disclosure will be described below.

It should be noted that, because the mechanical switch and the electronic switch of the solid-state circuit breaker are connected in series, upon both the mechanical switch and the electronic switch being in the on state, the solid-state circuit breaker is in the on state; upon both the mechanical switch and the electronic switch being in the off state, the solid-state circuit breaker is in the off state; upon the mechanical switch being in the on state and the electronic switch being in the off state, the solid-state circuit breaker is in a hot standby state; upon the solid-state circuit breaker being in the hot standby state, as long as the electronic switch is turned on by an electric signal, the solid-state circuit breaker will enter the on state.

In the case of manually operating the solid-state circuit breaker from off to on: referring to FIG. 4, the handle 2 is manually rotated from the off position to the on position, and the motion of the handle 2 is transmitted to the movable contact bracket 5 through the transmission assembly 6, so as to drive the movable contact 4 to move from the open position to the closed position, upon the movable contact 4 reaching the closed position, the contact micro-switch 8 is actuated to the on state of the contact micro-switch, and the mechanical switch is turned on, meanwhile, upon the handle 2 moving to the on position, the handle micro-switch 7 is actuated to the on state of the handle micro-switch, upon the contact micro-switch 8 being in the on state of the contact micro-switch 7 the handle micro-switch being in the on state of the handle micro-switch, the solid-state circuit breaker is a hot standby state, in this case, if the electronic switch is turned on, the solid-state circuit breaker is turned on.

In the case of manually switching the solid-state circuit breaker from on to off: referring to FIG. 5, the handle 2 is manually rotated from the on position to the off position, upon the handle 2 leaving the on position, the handle micro-switch 7 is released to the off state of the handle micro-switch, at this time, in response to the off state of the handle micro-switch 7, the electronic switch is turned off, and then the tripping unit 9 is electrically driven, the transmission assembly 6 is actuated to drive the movable contact 4 to move from the closed position to the open position, upon the movable contact 4 leaving the closed position, the contact micro-switch 8 is released to the off state of the contact micro-switch, upon the movable contact 4 reaching the off position, the mechanical switch is turned off, so that the solid-state circuit breaker is turned off.

It should be noted that, in the case of manually switching the solid-state circuit breaker from on to off, although the handle 2 is manually rotated from the on position to the off position, theoretically, the handle 2 will drive the transmission assembly 6 to drive the movable contact 4 to move to the open position, however, because the off state of the handle micro-switch triggers the electronic switch to be turned off, and further triggers the electrically driven tripping unit 9, and the electrically driven tripping process is usually faster than the mechanical transmission, so the driving force of the transmission assembly 6 and the movable contact 4 from the closed position to the open position comes from the electrically driven tripping unit 9, not from the handle 2. In addition, because the handle micro-switch 7 can be released upon the handle 2 leaving the off position, and then the electrically driven tripping process is triggered to drive the movable contact 4 to the open position, even if the operator repents in the process of manually rotating the handle 2 from the on position to the off position or the handle 2 is stuck in the process, the mechanical switch of the solid-state circuit breaker will be electrically driven to the off state, thus ensuring the circuit safety.

In the case of electrically driving the solid-state circuit breaker from on to off: as illustrated by FIG. 6, by a remote control or in a failure case, the electronic switch is turned off, and then the tripping unit 9 is driven electronically. The transmission assembly 6 is actuated to drive the movable contact 4 to move from the closed position to the open position. Upon the movable contact 4 leaving the closed position, the contact micro-switch 8 is released to the off state of the contact micro-switch 8. Upon the movable contact 4 reaching the open position, the mechanical switch is turned off and the solid-state circuit breaker is turned off. At the same time, the transmission assembly 6 is actuated to drive the handle 2 to move from the on position to the off position, upon the handle 2 leaving the on position, the handle micro-switch 7 is released to the off state of the handle micro-switch 7.

It should be noted that the transmission assembly 6 can reversely drive the handle 2 to move from the on position to the off position in the process from on to off. However, there is a breakpoint in the transmission assembly 6, and upon the handle 2 being stuck, the part of the transmission assembly 6 close to the movable contact bracket 5 can still be switched from on to off in the case of tripping, allowing the tripping function to be achieved.

The exemplary implementation of the solid-state circuit breaker proposed by the present disclosure has been described in detail above with reference to the preferred embodiment. However, it can be understood by those skilled in the art that various variations and modifications can be made to the above specific embodiment without departing from the concept of the present disclosure, and various technical features and structures proposed by the present disclosure can be combined in various ways without exceeding the protection scope of the present disclosure.

The invention claimed is:

1. A solid-state circuit breaker, comprising an electronic switch and a mechanical switch connected in series, wherein the mechanical switch comprises:

a housing;

a handle, rotatably installed to the housing and rotatable between an on position and an off position;

a movable contact and a stationary contact, the movable contact is configured to be movable between an open position and a closed position, in the open position, the movable contact is not in contact with the stationary contact, and in a closed position, the movable contact is in contact with the stationary contact;

a movable contact bracket, the movable contact is installed on the movable contact bracket;

a transmission assembly, being capable of transmitting a motion of the handle to the movable contact bracket to drive the movable contact to achieve contact and separation with the stationary contact;

a handle micro-switch, installed to the housing and configured to be actuated upon the handle rotating to the on position and released upon the handle leaving the on position, so that the handle micro-switch is in an on state of the handle micro-switch upon the handle being in the on position and the handle micro-switch is in an off state of the handle micro-switch upon the handle leaving the on position;

a contact micro-switch, installed to the housing and configured to be actuated by the moveable contact bracket upon the movable contact moving to a closed position and released upon the movable contact leaving the closed position, so that the contact micro-switch directly measures a position of the moveable contact independently of a position of the handle, and so that the contact micro-switch is in an on state of the contact micro-switch upon the movable contact being in the closed position and the contact micro-switch is in an off state of the contact micro-switch upon the movable contact leaving the closed position, wherein, by detecting a corresponding state of the handle micro-switch and a state of the contact micro-switch, it is achieved that, upon the solid-state circuit breaker being switched from off to on, the mechanical switch is turned on first, and then the electronic switch is turned on; and upon the solid-state circuit breaker being switched from on to off, the electronic switch is turned off first, and then the mechanical switch is turned off.

2. The solid-state circuit breaker according to claim 1, wherein, the movable contact bracket comprises an actuating protrusion, and the contact micro-switch is arranged close to an end point of a motion path of the actuating protrusion during a closing process, so that the actuating protrusion actuates the contact micro-switch to the on state of the contact micro-switch upon the movable contact bracket driving the movable contact to move to the closed position, and the actuating protrusion releases the contact micro-switch to the off state of the contact micro-switch upon the movable contact bracket driving the movable contact to leave the closed position.

3. The solid-state circuit breaker according to claim 1, wherein, the solid-state circuit breaker comprises an actuating member, and the motion of the handle between the on position and the off position drives the actuating member to move, and the handle micro-switch is arranged close to an end point of a motion path of the actuating member during a closing process, so that the actuating member is driven by the handle and drives the handle micro-switch to the on state of the handle micro-switch upon the handle moving to the on position, and the actuating member is driven by the handle and release the handle micro-switch to the off state of the handle micro-switch upon the handle leaving the on position.

4. The solid-state circuit breaker according to claim 1, wherein, in a case of manually operating the solid-state circuit breaker from off to on:

the handle is manually rotated from the off position to the on position, and the motion of the handle is transmitted to the movable contact bracket through the transmission assembly, so as to drive the movable contact to move from the open position to the closed position, upon the movable contact reaching the closed position, the contact micro-switch is actuated to the on state of the contact micro-switch, and the mechanical switch is turned on, meanwhile, upon the handle moving to the on position, the handle micro-switch is actuated to the on state of the handle micro-switch, upon the contact micro-switch being in the on state of the contact micro-switch and the handle micro-switch being in the on state of the handle micro-switch, the solid-state circuit breaker is in a hot standby state, upon the solid-state circuit breaker being in the hot standby state, if the electronic switch is turned on, the solid-state circuit breaker is turned on.

5. The solid-state circuit breaker according to claim 1, further comprising a tripping unit being electrically driven, and configured to trip upon being electrically driven so that the transmission assembly is actuated to switch the movable contact from the closed position to the open position.

6. The solid-state circuit breaker according to claim 5, wherein the tripping unit comprises: an excitation coil, wrapped with an insulating sheath; and a push rod assembly, driven to trigger tripping upon the excitation coil being energized.

7. The solid-state circuit breaker according to claim 5, further comprising an arc extinguishing chamber arranged close to the stationary contact, and the tripping unit is arranged between the transmission assembly and the arc extinguishing chamber.

8. The solid-state circuit breaker according to claim 5, wherein, in a case of manually switching the solid-state circuit breaker from on to off:

the handle is manually rotated from the on position to the off position, upon the handle leaving the on position, the handle micro-switch is released to the off state of the handle micro-switch, at this time, in response to the off state of the handle micro-switch, the electronic switch is turned off, and then the tripping unit is electrically driven, the transmission assembly is actuated to drive the movable contact to move from the closed position to the open position, upon the movable contact leaving the closed position, the contact micro-switch is released to the off state of the contact micro-switch, upon the movable contact reaching the off position, the mechanical switch is turned off, so that the solid-state circuit breaker is turned off.

9. The solid-state circuit breaker according to claim 5, wherein, in a case of electrically driving the solid-state circuit breaker from on to off:

the electronic switch is turned off;

the tripping unit is driven electronically;

the transmission assembly is actuated to drive the movable contact to move from the closed position to the open position;

upon the movable contact leaving the closed position, the contact micro-switch is released to the off state of the contact micro-switch;

upon the movable contact reaching the open position, (i) the mechanical switch is turned off and the solid-state circuit breaker is turned off, and the transmission assembly is actuated to drive the handle to move from the on position to the off position; and upon the handle leaving the on position, the handle micro-switch is released to the off state of the handle micro-switch.

10. The solid-state circuit breaker according to claim 9, wherein the case of electrically driving the solid-state circuit breaker from on to off is triggered remotely or upon a fault occurring.

11. The solid-state circuit breaker according to claim 1, further comprising a mechanical synchronization mechanism for multi-level use, wherein the mechanical synchronization mechanism comprises:

a transmission linkage, connected to a part of multiple levels of transmission assemblies and configured to interlock the multiple levels of transmission assemblies; and a tripping linkage, connected to multiple levels of tripping units and configured to interlock the multiple levels of tripping units.

* * * * *